United States Patent
Knox et al.

(10) Patent No.: US 6,351,292 B1
(45) Date of Patent: Feb. 26, 2002

(54) APPARATUS AND METHOD FOR GENERATING ON-SCREEN-DISPLAY MESSAGES USING LINE DOUBLING

(75) Inventors: Michael Dwayne Knox; Aaron Hal Dinwiddie, both of Fishers, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/269,246

(22) PCT Filed: Oct. 16, 1996

(86) PCT No.: PCT/US96/16514

§ 371 Date: Mar. 23, 1999

§ 102(e) Date: Mar. 23, 1999

(87) PCT Pub. No.: WO98/17058

PCT Pub. Date: Apr. 23, 1998

(51) Int. Cl.[7] ............... H04N 5/50; H04N 5/445
(52) U.S. Cl. ............... 348/569; 348/567
(58) Field of Search ............... 348/569, 589, 348/600, 469, 461, 467, 465, 468; H04N 5/46, 5/445, 5/50

(56) References Cited

U.S. PATENT DOCUMENTS

| 5,534,942 A | * | 7/1996 | Beyers, Jr. et al. | 348/569 |
| 6,118,494 A | * | 9/2000 | Knox et al. | 348/569 |
| 6,175,388 B1 | * | 1/2001 | Knox et al. | 348/569 |

FOREIGN PATENT DOCUMENTS

| GB | 2 292 294 A | * | 2/1996 | G06T/1/60 |
| GB | 2292294 | | 2/1996 | G06T/1/60 |
| WO | 94/29840 | | 12/1994 | G09G/1/14 |
| WO | WO 94 29840 A | * | 12/1994 | H04N/5/272 |
| WO | 95/35626 | | 12/1995 | H04N/5/445 |
| WO | WO 95 35626 A | * | 12/1995 | H04N/5/445 |

OTHER PUBLICATIONS

IEEE Transaction On Consumer Electronics, vol. 36, No. 3 Aug. 1999, New York US, pp. 678–683, XP000162906, Wei et al.: "A Universal High Performance Digital Performance Television controller".*

IEEE Transactions On Consumer Electronics,, vol. 36, No. 3, Aug. 1990, Wei et al. "A Universal High Performance Digital Performance Television Controller" pp. 678–683.

* cited by examiner

*Primary Examiner*—Michael Lee
(74) *Attorney, Agent, or Firm*—Joseph S. Tripoli; Paul P. Kiel

(57) ABSTRACT

An apparatus and concomitant method for generating an OSD message by constructing an OSD bitstream having OSD data defining a plurality of alternate OSD pixel lines. The OSD bitstream contains an OSD header and OSD data. An OSD unit retrieves pixel control information from the OSD header which is programmed by a processor of a decoding/displaying system. The OSD header contains information that is used to program a color palette of the OSD unit and to provide instructions as to the treatment of the OSD data. If the "Line Doubling Mode" is enabled in the OSD header, then the OSD unit will repeat each OSD line on the next line of video for an OSD region.

10 Claims, 3 Drawing Sheets

APPARATUS AND METHOD FOR GENERATING ON-SCREEN-DISPLAY MESSAGES USING LINE DOUBLING

FIELD OF THE INVENTION

The present invention relates to a method and apparatus for generating On-Screen-Display (OSD) messages using a line doubling mode. More particularly, this invention relates to a method and apparatus that reduces the memory bandwidth requirements of a decoding/displaying system by repeating each OSD line on the next line of video for an OSD region.

BACKGROUND OF THE INVENTION

On-Screen-Display messages play an important role in consumer electronics products by providing users with interactive information such as menus to guide them through the usage and configuration of the product. Other important features of OSD include the ability to provide Closed Captioning and the display of channel logos.

However, the heightened standard of digital video technology presents an ever increasing problem of generating and displaying OSD messages. For example, there are specific High Definition Television (HDTV) requirements that an HDTV must display up to 216 characters in four (4) "windows" versus the current National Television Systems Committee (NTSC) requirements of a maximum of 128 characters in one "window". These new requirements place severe strains on the decoding/displaying system used to decode and display television signals (e.g., HDTV, NTSC, MPEG, and the like), which must decode the incoming encoded data streams and present the decoded data to a display system with minimal delays. Since OSD messages must be displayed (overlaid) with the video data, the microprocessor of the decoding/displaying system must assign a portion of the memory bandwidth to perform OSD functions, thereby increasing the memory bandwidth requirements of a decoding/displaying system and the overall computational overhead.

Thus, a need exists for a method and apparatus for generating On-Screen-Display (OSD) messages without increasing the hardware requirements, e.g., memory bandwidth, of a decoding/displaying system.

SUMMARY OF THE INVENTION

The invention concerns an apparatus and concomitant method for generating OSD messages by constructing a valid OSD bitstream with instructions in the OSD header to repeat each OSD line.

More specifically, in accordance with the invention, an OSD unit retrieves an OSD bitstream from a storage device. The OSD bitstream contains an OSD header and OSD data. The OSD header contains control information that is used to program a color palette of the OSD unit and to provide instructions as to the treatment of the OSD data. The control information is programmed by a processor of a decoding/displaying system. If the "Line Doubling Mode" is enabled in the OSD header, then the OSD unit will repeat the OSD data such that each OSD line is repeated. An OSD line represents a line of OSD pixels in an OSD region. Thus, the OSD unit receives "x" lines of OSD data, and, in turn, displays "2x" lines of OSD data.

These and other aspects of the invention will be described with respect to the accompanying drawings.

DETAILED DESCRIPTION OF THE DRAWINGS

Figure 1:
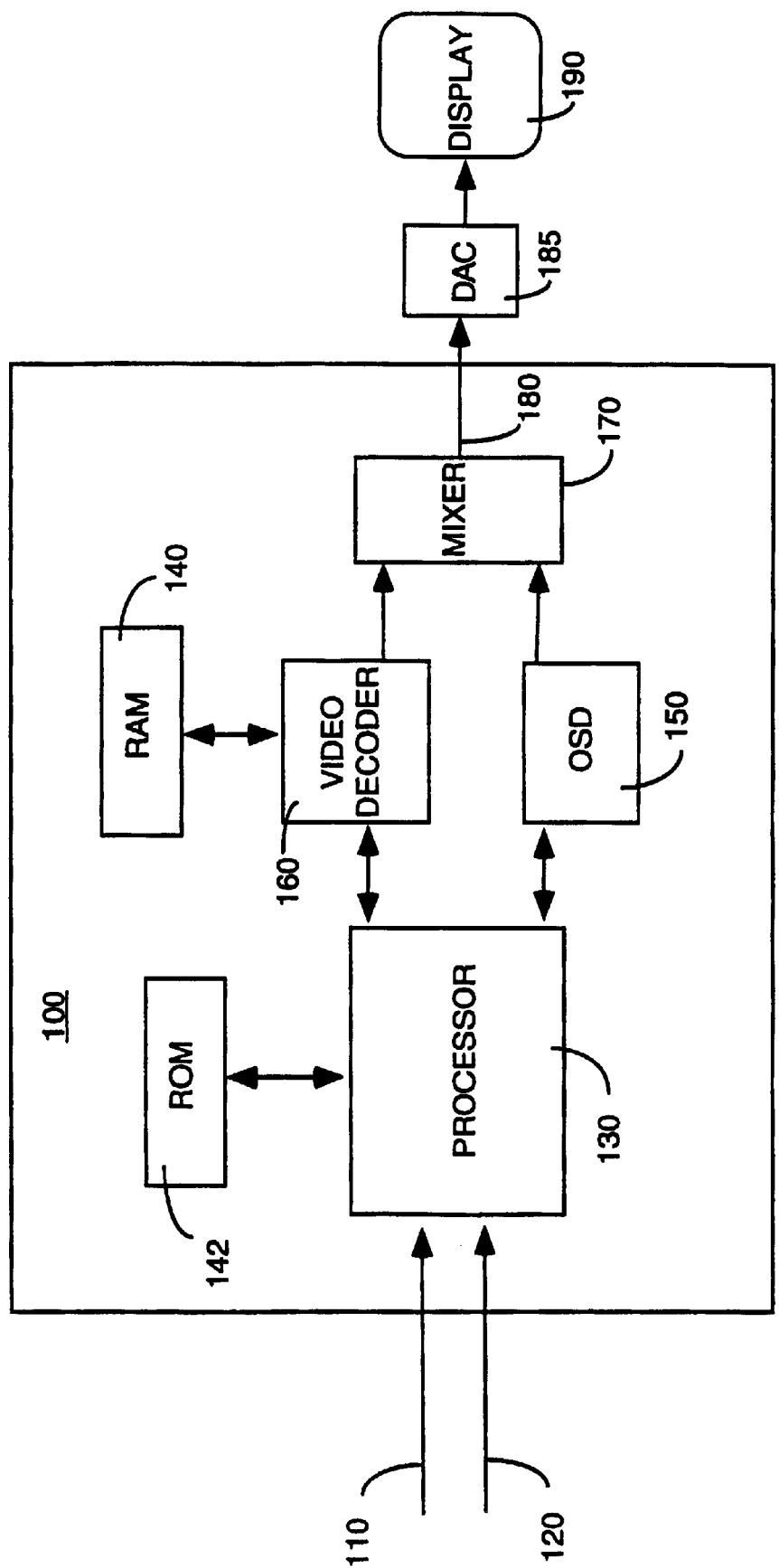
FIG. 1 is a block diagram of a decoding/displaying system including an OSD unit in accordance with an aspect of the invention.

FIG. 1 illustrates a block diagram of a decoding/displaying system for television signals 100 (hereinafter decoding system). The decoding system comprises a processor 130, a random access memory (RAM) 140, a read-only memory (ROM) 142, an OSD unit 150, a video decoder 160, and a mixer 170. The output of the mixer 170 is coupled to a display device 190 via path 180.

The present invention is described below in accordance with the MPEG standards, ISO/IEC international Standards 11172 (1991) (generally referred to as MPEG-1 format) and 13818 (1995) (generally referred to as MPEG-2 format). However, those skilled in the art will realize that the present invention can be applied or adapted to other decoding systems implementing other encoding/decoding formats.

In the preferred embodiment, the decoding system 100 performs real time audio and video decompression of various data streams (bitstreams) 120. The bitstreams 120 may comprise audio and video elementary streams that are encoded in compliance with the MPEG-1 and MPEG-2 standards. The encoded bitstreams 120 are generated by an encoder (not shown) and are transmitted to the decoding system through a communication channel. The encoded bitstreams contain a coded representation of a plurality of images and may include the audio information associated with those images, e.g., a multimedia data stream. The multimedia source may be a HDTV station, a video disk, a cable television station and the like. In turn, the decoding system 100 decodes the encoded bitstreams to produce a plurality of decoded images for presentation on the display 190 in synchronization with the associated audio information. However, for the purpose of this invention, the audio decoding function of the decoding system 100 is irrelevant and, therefore, not discussed.

More specifically, processor 130 receives bitstreams 120 and bitstreams 110 as inputs. Bitstreams 110 may comprise various control signals or other data streams that are not included in the bitstreams 120. For example, a channel decoder or transport unit (not shown) can be deployed between the transmission channel and the decoding system 100 to effect the parsing and routing of data packets into data streams or control streams.

In the preferred embodiment, processor 130 performs various control functions, including but not limited to, providing control data to the video decoder 160 and OSD unit 150, managing access to the memory and controlling the display of the decoded images. Although the present invention describes a single processor, those skilled in the art will realize that the processor 130 may comprise various dedicated devices to manage specific functions, e.g., a memory controller, a microprocessor interface unit and the like.

Processor 130 receives bitstreams 120 and writes the data packets into the memory 140 via video decoder 160. The bitstreams may optionally pass through a First-In-First-Out (FIFO) buffer (not shown) before being transferred via a memory data bus to the memory. Furthermore, there is generally another memory (not shown) which is used solely by the processor 130.

The memory 140 is used to store a plurality of data including compressed data, decoded images and the OSD bit map. As such, the memory is generally mapped into various buffers, e.g., a bit buffer for storing compressed data, an OSD buffer for storing the OSD bit map, various frame buffers for storing frames of images and a display buffer for storing decoded images.

In accordance with the MPEG standards, the video decoder 160 decodes the compressed data in the memory 140 to reconstruct the encoded images in the memory. In some cases, the decoded image is a difference signal that is added to a stored reference image to produce the actual image in accordance with the compression technique used to encode the image (e.g., to facilitate decoding a motion compensated image). Once an image is reconstructed, it is stored in the display buffer pending display via the mixer 170.

Similarly, the OSD unit 150 uses the memory 140 to store the OSD bit map or the OSD specification. The OSD unit allows a user (manufacturer) to define a bit map for each field which can be superimposed on the decoded image. The OSD bit map may contain information which is stored in a storage device, e.g., a ROM, concerning the configuration and options of a particular consumer electronics product. Alternatively, the OSD bit map may contain information relating to Closed Captioning and channel logos that are transmitted from a cable television, a video disk and the like. An OSD bit map is defined as a set of regions (generally in rectangular shapes) of programmable position and size, each of which has a unique palette of available colors.

The OSD bit map is written into the OSD buffer of the memory 140 which is assigned for this purpose by the user. However, those skilled in the art will realize that a ROM 142 or other equivalent storage devices can also serve this function as well.

When the OSD function is enabled for a particular image or frame, the processor 130 manipulates the data in memory 140 to construct an OSD bitstream. The OSD bitstream contains an OSD header and OSD data (data defining the OSD pixels).

More specifically, the processor 130 programs (formats and stores) the OSD header in the memory 140. The OSD header contains information concerning the locations of the top and bottom OSD field bit maps, palette data, pointer to the next header block and various display modes involving OSD resolution, color and compression. Once the OSD header is programmed, the processor 130 may manipulate the OSD data in the memory 140 in accordance with a particular implementation. For example, the OSD data is formatted in accordance with a selected mode, e.g., the Line Doubling Mode as discussed below. Alternatively, the processor may simply program the OSD header with pointers to the OSD data in the memory, where the stored OSD data is retrieved without modification to form the OSD bitstream.

The processor 130 then reports the enable status, e.g., OSD active, to the OSD unit 150, which responds by requesting the processor 130 for access to the OSD bitstream stored within the memory 140. The OSD bitstream is formed and retrieved as the OSD unit 150 reads the OSD headers, each followed by its associated OSD data. After receiving the OSD bitstream, the OSD unit processes the OSD pixel data in accordance with the instructions or selected modes in the OSD header. The OSD unit then waits for a pair of display counters (not shown) to attain count values that identifies the correct position on the display for inserting the OSD information (messages). At the correct position, the OSD unit forwards its output to the mixer 170. The output of the OSD unit 150 is a stream or sequence of digital words representing respective luminance and chrominance components of the on screen display. New memory accesses are requested as required to maintain the necessary data flow (OSD bitstream) through the OSD unit to produce a comprehensive OSD display. When the last byte of the OSD pixel data for the current OSD region is read from the memory, the next OSD header is read and the process is repeated up through and including the last OSD region for the current frame.

Those skilled in the art will realize that the order of constructing and retrieving the OSD bitstream as discussed above can be modified. For example, the OSD header can be read from the memory as the processor is formatting the OSD data, or the OSD data can be processed and displayed as OSD messages by the OSD unit without having to retrieve the entire OSD bitstream.

Since OSD pixel data is superimposed on the decoded image, the mixer 170 serves to selectively blend or multiplex the decoded image with the OSD pixel data. Namely, the mixer 170 has the capability to display at each pixel location, an OSD pixel, a pixel of the decoded image or a combination (blended) of both types of pixels. This capability permits the display of Closed Captioning (OSD pixel data only) or the display of transparent channel logos (a combination of both OSD pixels and decoded image pixels) on a decoded image.

Video decoder 160 and OSD unit 150 both form streams or sequences of digital words representing respective luminance and chrominance components. These sequences of video component representative digital words are coupled via mixer 170 to a digital-to-analog converter (DAC) 185. The luminance and chrominance representative digital words are converted to analog luminance and chrominance signals by the respective sections of the DAC.

The OSD unit 150 can be used to display a user defined bit map over any part of the displayable screen, independent of the size and location of the active video area. This bit map can be defined independently for each field and specified as a collection of OSD regions. A region is often a rectangular area specified by its boundary and by a bit map defining its contents. The bit map is displayed in a plurality of OSD lines, where each OSD line represents a line of OSD pixels in an OSD region. Each region has associated with it a palette defining a plurality of colors (e.g., 4 or 16 colors) which can be used within that region. If required, one of these colors can be transparent, allowing the background to show through as discussed above.

However, handling the OSD functions for a frame increases the computational overhead of the processor 130 and, more importantly, places severe strains on the memory bandwidth of the processor because the processor 130 must service memory requests from both the video decoder 160 and the OSD unit 150. As such, the present invention reduces the size of the OSD bitstream by implementing the Line Doubling Mode. By repeating each OSD line, the amount of OSD data that must be read from the memory 140 is reduced by 50%. For example, by placing five (5) lines of OSD data in memory 140, and setting the Line Doubling Mode to be true, the OSD unit 150 produces ten (10) lines within an OSD region on the display output.

Figure 2:
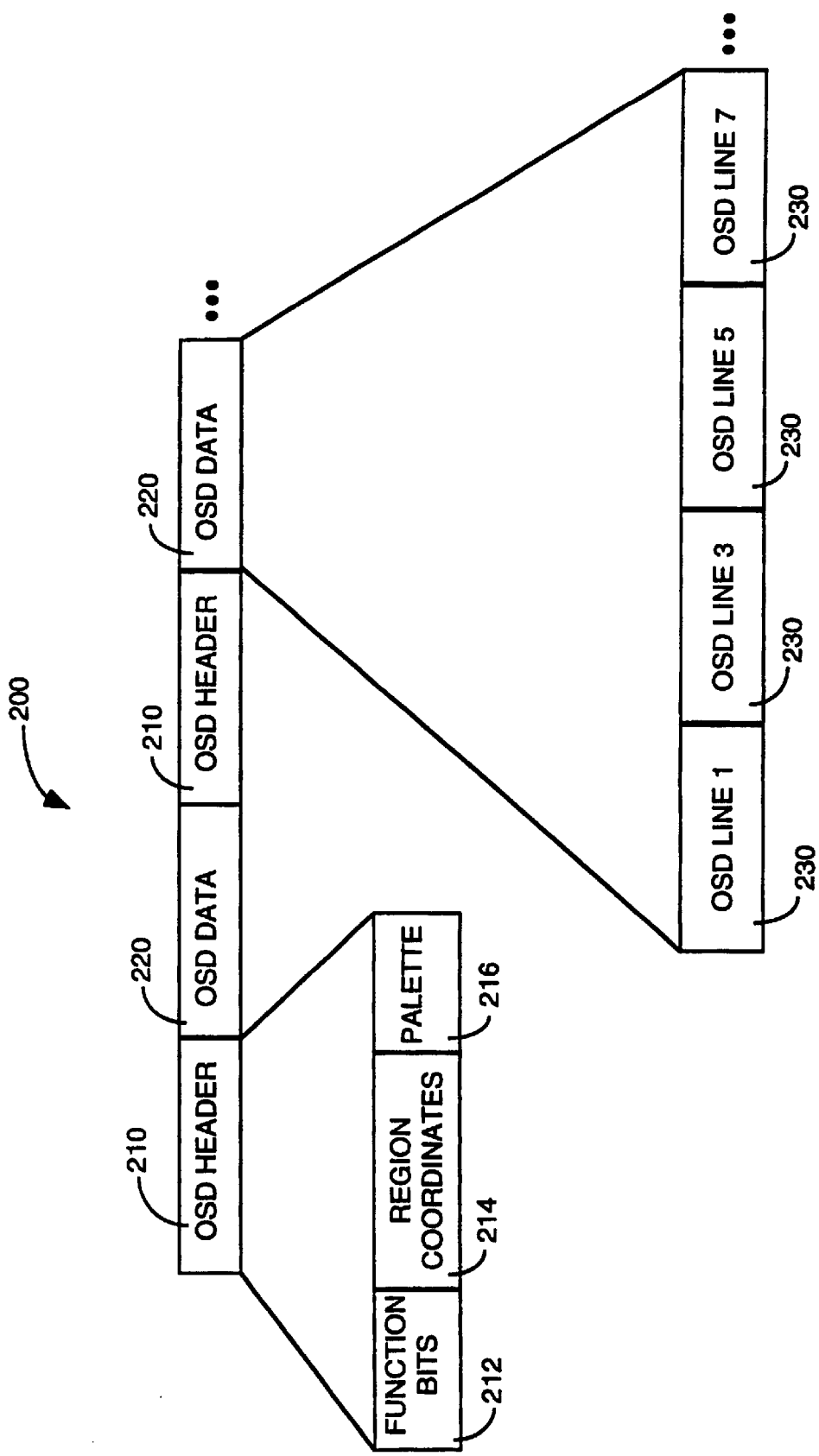
FIG. 2 is a block diagram which discloses the structure of a sample OSD bitstream using the Line Doubling Mode.

FIG. 2 illustrates the structure of a sample OSD bitstream 200 using the Line Doubling Mode. The OSD bitstream comprises a plurality of OSD headers 210, each followed by OSD data 220. In one embodiment, the header is comprised of five 64-bit words, followed by any number of 64-bit OSD data (bit map) words. The OSD header 210 contains information relating to the OSD region coordinates 214, the various entries of the palette 216 for a particular OSD region, and various function codes (bits) 212. Those skilled in the art will realize that the OSD header can be of any length. A longer header can provide more information and options, e.g., a palette with more entries, but at the expense of incurring a higher computational overhead, i.e., more read and write cycles are required to implement the OSD functions. In fact, the content of the OSD header is illustrative of a particular embodiment and is not limited to the specific arrangement as illustrated in FIG. 2.

The OSD region coordinates 214 contain the positions of the left and right edge of an OSD region, i.e., row start and stop positions and column start and stop positions. For interlaced display, the region coordinates include the positions (pointers) of the top and bottom field pixel bit maps for the corresponding OSD region. Finally, the OSD region coordinates 214 include a pointer to the next header block in the memory.

The palette 216 contains a plurality of entries where each entry contains a representation of chrominance and luminance levels for an OSD pixel. The palette information 216 is used to program the OSD palette. Since each OSD header contains palette information 216, the available colors can be selectively changed for each OSD header and its associated OSD data bytes.

The function codes (bits) 212 contain information relating to various modes, including but not limited to, display options and OSD bitstream options. In the preferred embodiment, the function bits contain a single bit to indicate whether the "Line Doubling Mode" is enabled. When the Line Doubling Mode is enabled, the OSD unit will repeat the OSD data such that each OSD line is repeated. As such, the processor 130 is only required to generate one-half of the OSD data. Namely, the size of the OSD bitstream is reduced by approximately 50%.

The OSD data 220 contains bit map data in left to right and top to bottom order. The OSD data is generally used to define the color index to the OSD palette for each pixel in the bit map imagery. In the preferred embodiment, if the "Line Doubling Mode" is enabled, then the OSD data 220 defines a plurality of data bytes which are represented by a plurality of OSD lines 230 (OSD pixel lines). The length of an OSD line depends on the size of an OSD region. Each OSD line contains sufficient OSD data for the OSD unit 150 to display a single horizontal line of OSD pixels in an OSD region. By repeating each OSD line, the OSD bitstream only carries OSD data for every other OSD line (alternating OSD pixel lines)(e.g., lines 1, 3, 5, 7, . . . , as illustrated in FIG. 2).

This mode of operation allows the processor 130 to gain a 2:1 compression ratio over the normal display mode where the OSD bitstream carries OSD data for all OSD lines. The saving is more significant where the OSD regions are particularly large. In the Line Doubling Mode, the OSD display resolution is vertically reduced by 50%, since each successive pair of horizontal OSD lines displays the same information.

However, a reduction in OSD resolution in exchange for a higher OSD message display rate is acceptable and appropriate for various OSD implementations, e.g., Closed Captioning. Closed Captioning requires the rapid display of OSD messages that generally correlate to words spoken for a series of frames (images). Since it is desirable to view the Closed Captioning as the images are displayed, the reduction in resolution is an acceptable tradeoff. Furthermore, since the OSD messages within the Closed Captioning are displayed only briefly, the reduced resolution is generally not noticeable. Thus, the Line Doubling Mode decreases the number of memory operations without limiting the display capabilities of a particular OSD implementation.

Finally, although the Line Doubling Mode is selected for an OSD header 210, the OSD unit 150 supports multiple header blocks which can each have a different resolution mode. Thus, the OSD unit is able to display different types of resolution or formats on the same video screen. For example, the borders and various portions of a single OSD region can be displayed in a lower resolution. Similarly, different OSD regions can be displayed in different resolutions depending on the OSD data being displayed.

The selection of the Line Doubling Mode is controlled by the user via the processor 130. This control can be implemented using software that detects the need to minimize memory access by the OSD unit 150. For example, the video decoder 160 may receive a series of complicated encoded frames that require additional memory access. To minimize memory access conflicts between the OSD unit and the video decoder, the processor can offset the increased demand of the video decoder by enabling the Line Doubling Mode in the OSD bitstream.

Figure 3:
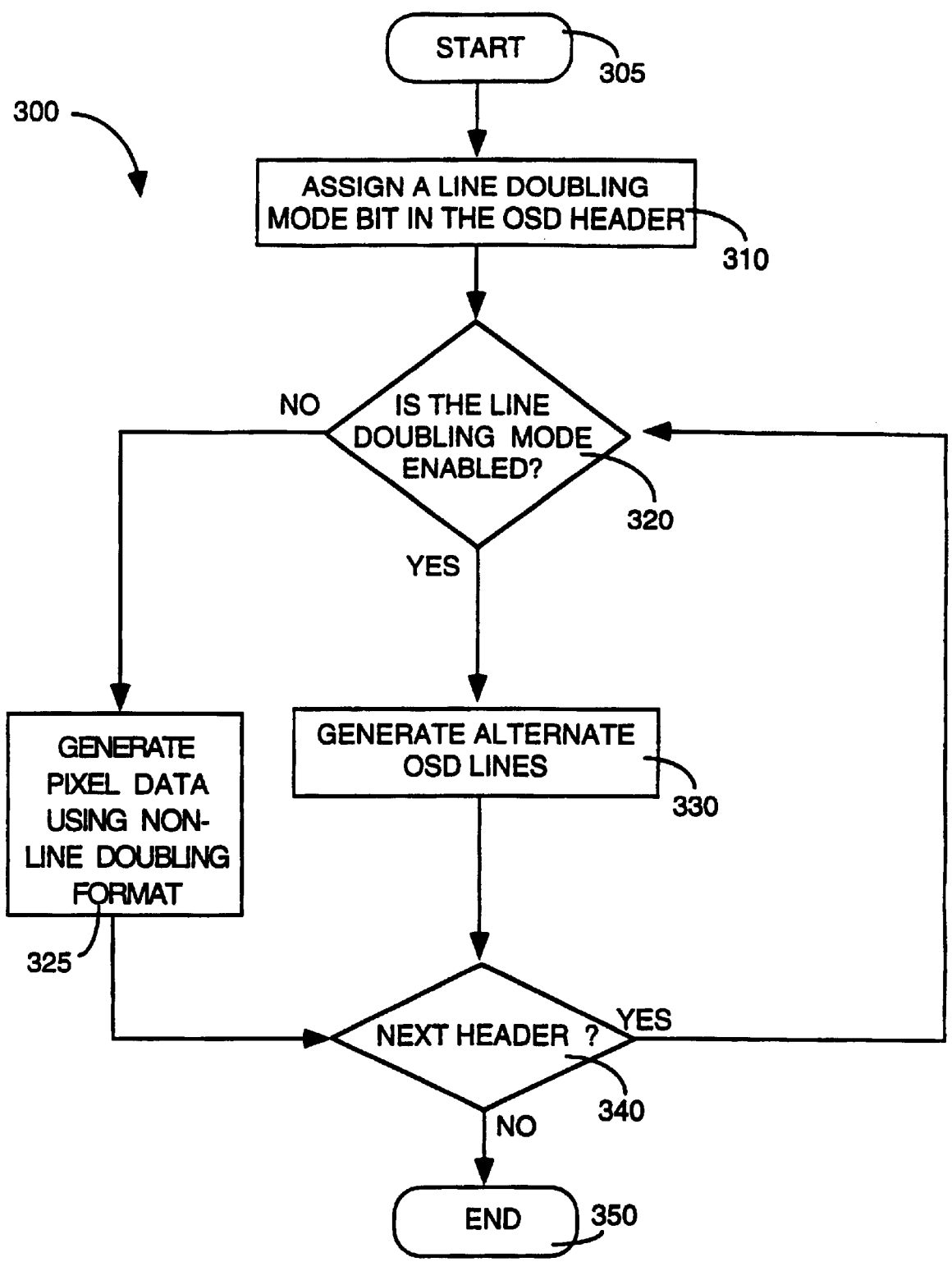
FIG. 3 is a flowchart illustrating the method for constructing a valid OSD bitstream with the Line Doubling Mode.

FIG. 3 illustrates a method 300 for constructing an OSD bitstream with the Line Doubling Mode. The method is generally recalled from a storage device, e.g., a memory, and executed by the processor 130. The OSD bitstream is generated by the processor 130 and is processed by the OSD unit 150. Method 300 constructs an OSD bitstream by generating an OSD header having a line doubling mode bit, followed by a plurality of data bytes.

Referring to FIG. 3, the method 300 begins at step 305 and proceeds to step 310 where a bit in the OSD header is designated as a line doubling mode bit. If the Line Doubling Mode is enabled in the OSD header, then the OSD data bytes represent a plurality of OSD lines, where each OSD line is repeated upon display by the OSD unit. If the Line Doubling Mode is not enabled, then the OSD data bytes are treated in accordance with a normal format, where the OSD lines are displayed by the OSD unit without repetition.

In step 320, method 300 determines whether the Line Doubling Mode is enabled. If the query is negatively answered, method 300 proceeds to step 325 where the OSD data bytes are generated using a non-line doubling format. Method 300 then proceeds to step 340.

If the query at step 320 is affirmatively answered, method 300 proceeds to step 330 where a plurality of alternate OSD lines is disposed within the OSD data bytes. Each OSD line comprises sufficient OSD pixels for the OSD unit 150 to display a single horizontal line in an OSD region. Namely, the OSD bitstream only carries OSD data for every other OSD line.

In step 340, method 300 determines whether there is another OSD header. A new OSD header may be required if the various modes represented by the function bits 212 are modified. Similarly, a new header is required for each new OSD region on a frame. If the query is negatively answered, method 300 proceeds to step 350 where method 300 ends. If the query is affirmatively answered, method 300 proceeds to step 320 where the steps of 320–330 are repeated for each additional OSD header. In this manner, the OSD bitstream may comprise both line doubling OSD data bytes and non-line doubling OSD data bytes.

There has thus been shown and described a novel method and apparatus for constructing an OSD bitstream having a plurality of alternate OSD pixel lines. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Method for constructing an On-Screen Display (OSD) bitstream, said method comprising the steps of:

setting a bit in an OSD header where said bit is used to indicate a line doubling mode; and generating OSD data defining a plurality of alternate OSD pixel lines.

2. The method of claim 1 wherein each of said plurality of OSD pixel lines defines a plurality of OSD pixels to be displayed in a single horizontal line of an OSD region.

3. The method of claim 1, further comprises the step of:

generating OSD data defining a plurality of non-alternating OSD pixel lines.

4. An OSD bitstream stored in a storage medium comprising:

a header having a bit to indicate a line doubling mode; and a plurality of OSD data bytes, coupled to said header, defining a plurality of alternating OSD pixel lines.

5. The OSD bitstream of claim 4, wherein each of said plurality of OSD lines defines a plurality of OSD pixels to be displayed in a single horizontal line of an OSD region.

6. The OSD bitstream of claim 4, wherein said OSD data bytes further defines non-alternating OSD pixel lines.

7. Apparatus for generating an OSD bitstream comprising:

a storage medium for storing an OSD header and OSD data; and a processor, coupled to said storage medium, for enabling a line doubling mode bit within said OSD header and for reading said OSD header and said OSD data defining a plurality of alternating OSD pixel lines to form the OSD bitstream.

8. The apparatus of claim 7, wherein said storage medium is a read only memory (ROM).

9. The apparatus of claim 7, wherein said storage medium is a random access memory (RAM).

10. Apparatus for generating an OSD message comprising:

a storage medium for storing an OSD bitstream having a header and OSD data;

a processor, coupled to said storage medium, for programming a line doubling mode bit within said OSD header and for formatting said OSD data defining a plurality of alternating OSD pixel lines; and an OSD unit, coupled to said processor, for processing said OSD bitstream to form the OSD message.

* * * * *